US011630058B2

(12) United States Patent
Nagase et al.

(10) Patent No.: US 11,630,058 B2
(45) Date of Patent: *Apr. 18, 2023

(54) CONCENTRATION MEASUREMENT DEVICE

(71) Applicant: FUJIKIN INCORPORATED, Osaka (JP)

(72) Inventors: Masaaki Nagase, Osaka (JP); Kazuteru Tanaka, Osaka (JP); Keiji Hirao, Osaka (JP); Tadayuki Yakushijin, Osaka (JP); Kouji Nishino, Osaka (JP); Michio Yamaji, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,349

(22) Filed: Jun. 10, 2022

(65) Prior Publication Data

US 2022/0299432 A1 Sep. 22, 2022

Related U.S. Application Data

(62) Division of application No. 17/279,018, filed as application No. PCT/JP2019/036301 on Sep. 17, 2019, now Pat. No. 11,391,668.

(30) Foreign Application Priority Data

Sep. 25, 2018 (JP) .............................. JP2018-179089

(51) Int. Cl.
*G01N 21/33* (2006.01)
(52) U.S. Cl.
CPC ......... *G01N 21/33* (2013.01); *G01N 2201/08* (2013.01)

(58) Field of Classification Search
CPC .............. G01N 21/33; G01N 2201/08; G01N 2021/0314; G01N 21/05; G01N 21/27; G01N 21/255; G01N 21/314
(Continued)

(56) References Cited

U.S. PATENT DOCUMENTS

| 6,408,879 B1 | 6/2002 | Ohmi et al. |
| 2002/0136676 A1 | 9/2002 | Komehana et al. |

(Continued)

FOREIGN PATENT DOCUMENTS

| JP | 2005-273496 A | 10/2005 |
| JP | 2014-219294 A | 11/2014 |

(Continued)

OTHER PUBLICATIONS

International Search Report issued in PCT/JP2019/036301; dated Dec. 3, 2019.

*Primary Examiner* — Md M Rahman
(74) *Attorney, Agent, or Firm* — Studebaker & Brackett PC

(57) ABSTRACT

A concentration measuring device 100 comprises: a measurement cell 4 having a flow path, a light source 1, a photodetector 7 for detecting light emitted from the measurement cell, and an arithmetic circuit 8 for calculating light absorbance and concentration of a fluid to be measured on the basis of an output of the photodetector, the measurement cell includes a cell body, a window portion 3 fixed to the cell body so as to contact the flow path, and a reflective member 5 for reflecting light incident on the measurement cell through the window portion, the window portion is fixed to the cell body 40 by a window holding member 30 via a gasket 15, an annular sealing protrusion 15a is provided on a first surface of the gasket for supporting the window portion, and an annular sealing protrusion 42a is also provided on a support surface 42 of the cell body for (Continued)

supporting the second surface opposite to the first surface of the gasket.

5 Claims, 8 Drawing Sheets

(58) Field of Classification Search
USPC .......................................................... 356/440
See application file for complete search history.

(56) References Cited

U.S. PATENT DOCUMENTS

| | | |
|---|---|---|
| 2010/0182606 A1 | 7/2010 | Prenner et al. |
| 2012/0327397 A1 | 12/2012 | Tormod |
| 2016/0084700 A1 | 3/2016 | Nagase et al. |
| 2016/0282317 A1 | 9/2016 | Gunji |
| 2016/0351443 A1* | 12/2016 | George .................... B01J 23/38 |
| 2019/0025200 A1* | 1/2019 | Yang .................... B01J 19/0033 |
| 2019/0271636 A1 | 9/2019 | Deguchi et al. |

FOREIGN PATENT DOCUMENTS

| | | |
|---|---|---|
| JP | 2016-180728 A | 10/2016 |
| JP | 2018-025499 A | 2/2018 |
| WO | 2018/021311 A1 | 2/2018 |

\* cited by examiner

BEFORE TIGHTENING        AFTER TIGHTENING        REMOVING

CONCENTRATION MEASUREMENT DEVICE

CROSS-REFERENCE TO RELATED APPLICATIONS

This application is a Divisional of U.S. patent application Ser. No. 17/279,018, filed on Mar. 23, 2021, which is the U.S. National Phase of International Application No. PCT/JP2019/036301, filed on Sep. 17, 2019, which claims priority to and the benefit of Japanese Patent Application No. 2018-179089, filed on Sep. 25, 2018, the entire contents of which are incorporated herein by reference.

TECHNICAL FIELD

The present invention relates to a concentration measurement device, particularly to a concentration measurement device for measuring the concentration of a fluid to be measured by detecting an intensity of light passed through a measurement cell.

BACKGROUND OF INVENTION

Conventionally, a concentration measurement device incorporated in a gas supply line for supplying a source gas formed of a liquid material or a solid material of an organometal (MO) and the like to a semiconductor manufacturing equipment is well known, which is configured to measure the concentration of the gas flowing through the gas supply line, so-called in-line type concentration measurement device.

In this type of concentration measurement device, light having a predetermined wavelength from a light source enter through an incident window to a measurement cell in which a fluid to be measured flows, and transmitted light passing through the measurement cell is received by a light receiving element, whereby absorbance is measured. In addition, the concentration of the fluid to be measured can be calculated from the measured absorbance according to Lambert-Beef's law (for example, Patent Documents 1 to 3).

In the present specification, various transmitted light detection structures used for detecting the concentration of the fluid to be measured introduced into the interior are broadly referred to as measurement cells. The measurement cell includes not only a cell structure branched from the gas supply line and arranged separately, but also an in-line type transmitted light detection structure provided in the middle of the gas supply line as shown in Patent Document 1.

Patent Document 2 discloses a reflection type concentration measurement device, in which a reflection member is provided at an end portion of a measurement cell, and the concentration of a fluid flowing in the measurement cell is detected based on the absorbance of light making one reciprocation in the measurement cell. In addition, Patent Document 3 discloses a concentration measurement device, in which a pressure sensor is provided downstream of a measurement cell to obtain absorbance of a fluid to be measured from an output of an optical detector and to calculate the concentration of the fluid to be measured based on the absorbance and output of the pressure sensor.

PRIOR-ART DOCUMENTS

Patent Literature

Patent Document 1: Japanese Laid-Open Patent Publication No. 2014-219294

Patent Document 2: International Publication No. WO2018/021311

Patent Document 3: Japanese Laid-Open Patent Publication No. 2018-25499

SUMMARY OF INVENTION

Problem to be Solved by Invention

In an in-line concentration measurement device, in order to properly seal a measurement cell having a flow path formed therein, it is necessary to fix an window portion for light incidence or light emission hermetically at the end of the cell body. However, when fixing the window portion using a window holding member as in the conventional art, provided with an annular protrusion for sealing on the support surface of the cell body, the annular protrusion collapses upon tightening of the window portion, there is a problem that the sealing property may be reduced after replacing the window portion.

In view of the above problem, the main object of the present invention is to provide a concentration measurement device having good sealing ability and improved reusability for easy maintenance.

Means for Solving Problem

A concentration measurement device according to an embodiment of the present invention comprises: a measurement cell having a flow path for flowing a fluid to be measured; a light source for emitting incident light to the measurement cell; a photodetector for detecting light emitted from the measurement cell; and an arithmetic circuit for calculating absorbance and concentration of the fluid to be measured on the basis of an output from the photodetector, wherein the measurement cell includes a cell body, a window portion fixed to the cell body so as to contact the flow path, and a reflecting member disposed opposite to the window portion across the flow path, the reflecting member reflecting light incident on the measurement cell through the window portion from the light source and reflecting the light from the measurement cell through the window portion, the window portion is fixed to the cell body by a window holding member via a gasket, and a sealing annular protrusion is provided on a first surface of the gasket for supporting the window portion, an annular sealing protrusion is also provided on the support surface of the cell body for supporting a second surface opposite to the first surface of the gasket, and the concentration measurement device is configured so as that when the window portion is pressed against the cell body by the window holding member, while the sealing protrusion provided on the first surface of the gasket deforms, the second surface of the gasket also deforms by the sealing protrusion provided on the support surface of the cell body.

In an embodiment, the surface of the window portion is arranged so as to be inclined at an inclination angle of equal to or greater than 1° and equal to or less than 5° with respect to a surface orthogonal to the central axis of the flow path.

In an embodiment, the window holding member is formed so that a lower surface for pressing the window portion is non-parallel to an upper surface facing the lower surface, and a collimator connected to the light source is fixed on the upper surface of the window holding member so that the central axis of the collimator is parallel to the central axis of the flow path.

In an embodiment, the arithmetic circuit is configured to determine the fluid concentration according to Lambert-Beer's law on the basis of a detection signal of the photodetector for measuring the intensity of the light that has traveled back and forth through the flow path of the measurement cell.

In an embodiment, an inlet and an outlet communicating with the flow path are provided at both ends of the measurement cell, and the inlet and the outlet are provided on a first side of the flow path and a second side opposite to the first side, thereby forming a vertical measurement cell.

In an embodiment, the light source and the measurement cell are provided spaced apart by a light guide member including an optical fiber, the light source is configured to synthesize ultraviolet light of a plurality of wavelengths, the reflective member includes a reflective layer formed of a material containing aluminum or dielectric multilayer films.

Effect of Invention

According to the embodiments of the present invention, a concentration measurement device capable of maintaining sealing property even when replacing a window portion and the like, and having improved maintainability is provided.

BRIEF DESCRIPTION OF DRAWINGS

FIG. 4A is a plan view, FIG. 4B is a cross-sectional view taken along line b-b, and FIG. 4C is a cross-sectional view taken along line c-c.

DETAILED DESCRIPTION OF EMBODIMENTS

Embodiments of the present invention will be described below with reference to the drawings, but the present invention is not limited to the following embodiments.

Figure 1:
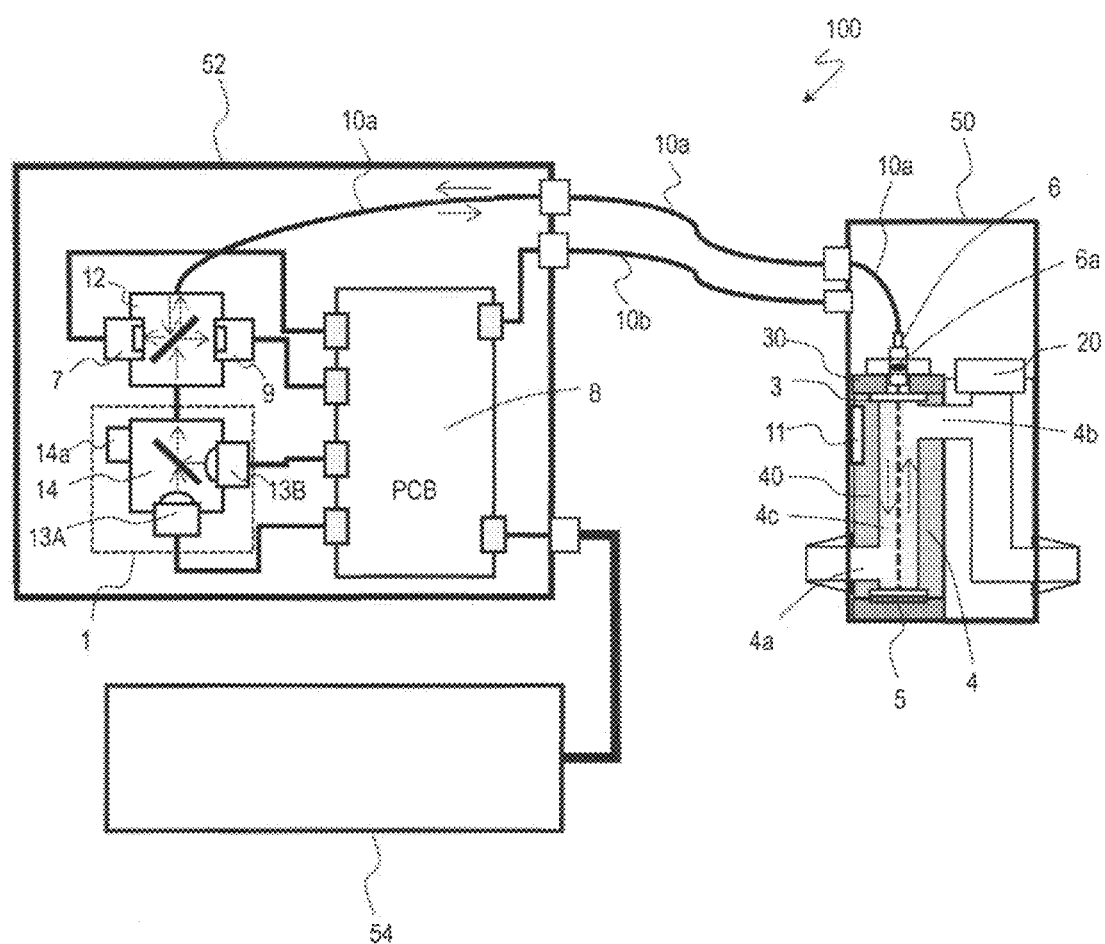
FIG. 1 is a schematic diagram showing the overall configuration of the concentration measurement device according to an embodiment of the present invention.

FIG. 1 is a schematic diagram showing the overall configuration of the concentration measurement device 100 according to an embodiment of the present invention. The concentration measurement device 100 comprises a high-temperature gas unit 50 having a measurement cell 4 incorporated in a gas supply line, and an electric unit 52 disposed apart from the high-temperature gas unit 50 and including a light source 1, an arithmetic circuit 8, and the like. The high-temperature gas unit 50 and the electric unit 52 are connected by an optical fiber 10a and a sensor cable 10b.

The high-temperature gas unit 50 may be heated to, for example, about 100° C. to 150° C. depending on the type of fluid to be measured. But the electric unit 52, which is disposed apart from the high-temperature gas unit, is typically maintained at room temperature (such as a cleanroom atmosphere). Examples of fluids to be measured include process gases containing organometallic materials such as trimethylgallium (TMGa) or trimethylaluminum (TMAl). Note that although "high-temperature gas unit" is used here, the temperature is not necessarily high, and when a gas of room temperature or lower is used, the gas may be used in a state where the temperature is not high (not heated).

Further, in the illustrated embodiment, an external controller 54 is connected to the electric unit 52, by device net communication, or the like. The external control device 54 can transmit an operation control signal to the concentration measurement device 100 or receive a measured concentration signal from the concentration measurement device 100.

In the high-temperature gas unit 50, a measurement cell 4 having an inlet 4a and an outlet 4b of the fluid to be measured, a flow path 4c extending in the longitudinal direction, a translucent window portion (translucent plate) 3 in contact with the flow path 4c is provided. In addition, a reflecting member 5 for reflecting the incident light is provided in the measurement cell 4. In the present specification, light includes not only visible light but also at least infrared light and ultraviolet light and may include electromagnetic waves of any wavelength. Translucency means that the internal transmittance with respect to the light incident on the measurement cell 4 is sufficiently high to enable concentration measurement.

The window portion 3 of the measurement cell 4 is fixed to the cell body 40 by the window holding member 30, a collimator 6 connected with an optical fiber 10a is attached to the window holding member 30. The collimator 6 having a collimator lens 6a can enter the light from the light source 1 into the measurement cell 4 as parallel light, and the collimator 6 can also receive the reflected light from the reflecting member 5. The collimator 6 is designed so that the concentration measurement can be performed with high accuracy without breakage even when the gas to be measured flowing through the measurement cell 4 is at a high temperature.

Further, in the present embodiment, a pressure sensor 20 for detecting the pressure of the fluid to be measured flowing through the measurement cell 4 is provided in the high-temperature gas unit 50. In the present embodiment, although the pressure sensor 20 is provided downstream of the outlet 4b of the measurement cell 4, it may also be provided upstream of the measurement cell 4, or in the middle of the flow path 4c of the measurement cell 4. The pressure sensor 20 may have any form, as long as it can measure the pressure of the fluids present in the flow path 4c in the measurement cell 4, so various known pressure sensors may be used. In addition, a temperature sensor 11 for measuring the temperature of the fluid to be measured is provided in the measurement cell 4. Outputs of the pressure sensor 20 and the temperature sensor are input to the electric unit 52 via a sensor cable 10b. The temperature sensor 11 is disposed in the vicinity of the outlet 4b in the present embodiment, it may be installed near the inlet 4a, or in the vicinity of the pressure sensor 20, or in the window portion 3, as long as the temperature of the fluid present in the flow path 4c can be measured.

The electric unit 52 includes a light source 1 for generating light to be incident on the measurement cell 4, a measurement photodetector 7 for receiving light from the measurement cell 4, an arithmetic circuit 8 configured to calculate the concentration of the fluid to be measured on the basis of the detection signal corresponding to the intensity of the received light output from the measurement photodetector 7, and a reference photodetector 9 for receiving reference light from the light source 1.

In the present embodiment, the measurement photodetector 7 and the reference photodetector 9 are disposed to face each other across a beam splitter 12. The beam splitter 12 guides a portion of the light from the light source 1 to the reference photodetector 9 and guides the detection light from the measurement cell 4 to the measurement photodetector 7. As a light-receiving element constituting the measurement photodetector 7 and the reference photodetector 9, for example, a photodiode or a phototransistor is preferably used.

The arithmetic circuit 8 is configured by, for example, a processor, a memory, or the like, provided on the circuit board PCB, includes a computer program for executing a predetermined arithmetic operation based on an input signal, and can be realized by a combination of hardware and software.

In the present embodiment, the light source 1 is configured by using two light-emitting elements 13A and 13B, and the light-emitting elements 13A and 13B are LEDs that emit ultraviolet light having different wavelengths from each other. Using an oscillation circuit, driving currents of different frequencies are flowed in the light-emitting element 13A, 13B. By performing frequency analysis (e.g., fast Fourier transform or wavelet transform), from the detection signal detected by the measured photodetector 7, it is possible to measure the intensity of light corresponding to each wavelength component. The lights emitted from the light-emitting elements 13A and 13B are synthesized by a multiplexer 14 of WDM (wavelength division multiplexing system) and is incident on the measurement cell 4. The wavelength of the light of the light-emitting element 13A is, for example, 300 nm, and the wavelength of the light of the light-emitting element 13B is, for example, 365 nm. As the light-emitting elements 13A and 13B, a light-emitting element other than LED, for example, an LD (laser diode) may also be used. Further, instead of using a multiplexed light of a plurality of different wavelengths as the light source, it is also possible to utilize a light source of a single wavelength, in this case, the multiplexer and the frequency analysis circuit can be omitted. Three or more light-emitting element may be provided, it may also be configured to generate incident light using only anyone selected light-emitting element among those provided. Further, as shown in the figure, a temperature measurement resistor 14a may be attached to the multiplexer 14. Moreover, the light emitted by the light-emitting element is not limited to ultraviolet light and may be visible light or infrared light.

In the concentration measurement device 100, the light source 1 and the measurement cell 4 are connected by an optical fiber 10a, which is a light guide member. The light from the light source 1 is guided to the window portion 3 of the measurement cell 4 by the optical fiber 10a. Further, the optical fiber 10a also has a function of guiding the light reflected by the reflecting member 5 to the measurement photodetector 7. The optical fiber 10a may include an optical fiber for incident light and an optical fiber for detection light and may be provided in the form of an optical fiber bundle.

Figure 2:
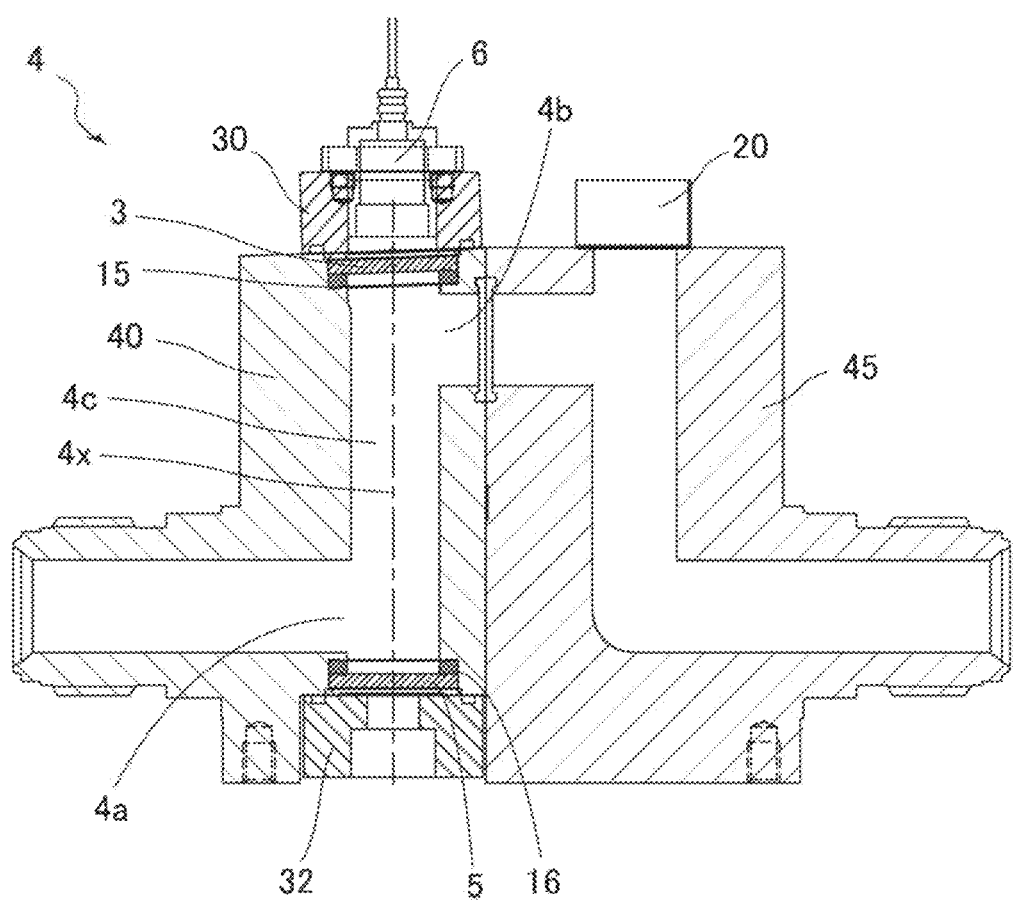
FIG. 2 is a cross-sectional view showing a detailed configuration of the measurement cell.

FIG. 2 is a cross-sectional view showing a more detailed configuration of the measurement cell 4. The measurement cell 4 is formed of a stainless steel cell body (cell block) 40, a rear stage block 45 is connected to the cell body 40 via a gasket or the like. A pressure sensor 20 is attached to the flow path of the rear stage block 45, so it is possible to measure the pressure of the fluid to be measured.

The inlet 4a and the outlet 4b of the measuring cell 4 is disposed on both sides of the flow path 4c (right side and left side of the flow path 4c in the drawing), when incorporated in the gas supply line, the concentration measurement device 100 is configured to flow gas in the horizontal direction as a whole, the flow path 4c extends in a direction perpendicular to the direction of the entire flow in the gas supply line. In the present specification, such a configuration is referred to as a vertical measurement cell 4. Using the vertical measurement cell 4, it is possible to realize space-saving when incorporated in the gas supply line and obtain an advantage of easy maintenance. In the illustrated measurement cell 4, the inlet 4a is disposed in the vicinity of the reflection member 5, the outlet 4b is disposed in the vicinity of the window portion 3, however, in another embodiment, the inlet 4a may be disposed in the vicinity of the window portion 3, and the outlet 4b may be disposed in the vicinity of the reflecting member 5, also there is no need to say that the flow path 4c does not have to extend in a direction perpendicular to the entire flow direction.

In the vertical measurement cell 4 described above, the window portion 3 is fixed to the support surface of the mounting recess provided on the upper surface of the cell body 40 by a window holding member 30, via a ring-shaped gasket 15. Here, the window portion 3 is disposed so that the window surface is inclined at an inclination angle of 0° to 10°, preferably 1° to 5°, more preferably 2° to 4°, with respect to the surface perpendicular to the central axial 4x of the flow path 4c (here a horizontal surface). To realize this, the support surface of the window portion 3 of the cell body 40 described above is also formed so as to be inclined with respect to the surface perpendicular to the central axis 4x, in the present embodiment, the entire mounting recess on the upper surface of the cell body 40 for accommodating the window portion 3 and the gasket 15 is formed so as to be inclined from the central axis 4x.

Similarly, the lower surface of the window holding member 30 of the window portion 3 (i.e., the surface for pressing the window portion 3) is disposed to have an inclination with respect to the horizontal surface. However, the upper surface of the window holding member 30 is disposed so as to form a horizontal surface parallel to the surface perpendicular to the central axis 4x. That is, the upper surface 30U and the lower surface 30D of the window holding member 30 are formed non-parallel (see FIG. 4C). Then, the collimator 6 is fixed to the horizontal surface that is the upper surface of the window holding member 30, so that the optical axis of the collimator 6 is coincident with the central axis 4x of the flow path.

In this configuration, by disposing the window portion 3 inclined, it is possible to improve the measurement accuracy because the light reflected by both sides of the window portion 3 is suppressed from being incident on the collimator 6 as detection light. On the other hand, since the optical axis of the collimator 6 coincides with the center axis 4x of the flow path, it is possible for the incident light to go straight along the flow path 4c.

As the window portion 3, a sapphire, which is resistant to the detection light the and has high transmittance to the detection light such as ultraviolet light used for concentration measurement and is mechanically and chemically stable, is suitably used. But other stable materials such as quartz glass may also be used. The cell body 40 of the measurement cell 4 (flow path forming portion) may be made of, for example, a SUS316L, a metal other than stainless steel such as SUS316L, non-metals, or non-ferrous material or the like depending on the flowing fluid to be measured.

Further, the reflecting member 5 disposed on the opposite end of the window portion 3 of the measurement cell is fixed to the support surface of the mounting recess provided on the lower surface of the cell body 40 by the pressing member 32 via a gasket 16. The reflecting surface of the reflecting member 5 is provided so as to be perpendicular to the traveling direction of the incident light or the central axis 4x of the flow path, the reflected light is reflected toward the window portion 3 through the optical path, which is substantially the same as that of the incident light. The reflecting member 5, for example, may have a configuration that is formed by using an aluminum layer as a reflective layer by sputtering on the back surface of a sapphire plate. However, the reflecting member 5 may have a configuration in which a reflecting mirror is disposed on the back surface of the sapphire plate. Further, the reflecting member 5 may include a dielectric multilayer film as a reflecting layer. If using a dielectric multilayer film, it is possible to selectively reflect light of a specific wavelength range (e.g., near ultraviolet). The dielectric multilayer film is configured of a laminate of a plurality of optical coatings having different refractive indices (for example, a laminate of high refractive index thin films and low refractive index thin films). By appropriately selecting the thickness and refractive index of each layer, light of a specific wavelength can be reflected or transmitted. Further, since the dielectric multilayer film is able to reflect light at an arbitrary ratio, for example, when the incident light is reflected by the reflecting member 5, rather than reflecting 100% of the incident light, partially (e.g., 10%) is made to transmit, it is possible to receive the transmitted light by a photodetector installed in the lower portion of the reflecting member 5, or an optical device connected to a photodetector. Light transmitted through the reflecting member 5 can be used as reference light, it is also possible to replace the reference photodetector 9 shown in FIG. 1.

In the measurement cell 4 described above, the optical path length of the light reciprocating in the measurement cell 4 can be defined by twice the distance between the surface of the window portion 3 and the surface of the reflecting member 5. In the concentration measurement device 100, the light incident on the measurement cell 4 and then reflected by the reflecting member 5 is absorbed by the gas present in the flow path 4c in the measurement cell 4 with a magnitude depending on the concentration of the gas. Then, the arithmetic circuit 8 (see FIG. 1) can measure the absorbance A at the absorption wavelength by analyzing the frequency of the detection signal from the measurement photodetector 7, and can further calculate the gas concentration C from the absorbance A according to the Lambert-Beer law as shown in the following equation (1).

$$A = -\log_{10}(I/I_0) = \alpha L C \tag{1}$$

In the above equation (1), $I_0$ is the intensity of incident light incident on the measurement cell, I is the intensity of light passing through the gas in the measurement cell, a is the molar extinction coefficient (m²/mol), L is the optical path length (m), and C is the concentration (mol/m³). The molar extinction coefficient α is a coefficient determined by the substance.

In addition, with respect to the incident light intensity $I_0$ in the above equation, the intensity of the light detected by the measurement photodetector 7 may be regarded as the incident light intensity $I_0$, when there is no light-absorbing gas in the measurement cell 4, (for example, when a purge gas, which does not absorb ultraviolet light, is filled, or when the cell is vacuumed).

Since the optical path length L of the measurement cell 4, as described above, can be defined as twice the distance between the window portion 3 and the reflecting member 5, as compared with the conventional concentration measurement apparatus, in which the light incident window and the light exit window are provided at both ends of the measurement cell, it is possible to obtain twice the optical path length. Thus, in spite of the miniaturization, the measurement accuracy can be improved. Further, in the concentration measurement device 100, since light incidence and light reception are performed by using only one optical device via one window portion 3 provided on one side of the measurement cell 4, the number of parts can also be reduced.

Furthermore, in the concentration measurement device 100, a pressure sensor 20 is provided to enable the measurement of the pressure of the gas in the measurement cell 4. Therefore, based on the output from the pressure sensor 20, the absorbance measured by the output of the photodetector can be corrected to the absorbance at a predetermined pressure (e.g. 1 atm). Then, based on the corrected absorbance, the concentration of the fluid to be measured can be determined by calculation from the Lambert-Beer's law in the same manner as the concentration measurement device described in Patent Document 3. In this manner, since the arithmetic circuit 8 calculates the concentration of the fluid to be measured using the measurement photodetector 7 and the pressure sensor 20, the concentration measurement can be performed with higher accuracy. And because the temperature sensor 11 for measuring the temperature of the gas flowing through the measurement cell 4 is further provided, the concentration can be detected by further correcting the temperature.

Figure 3:
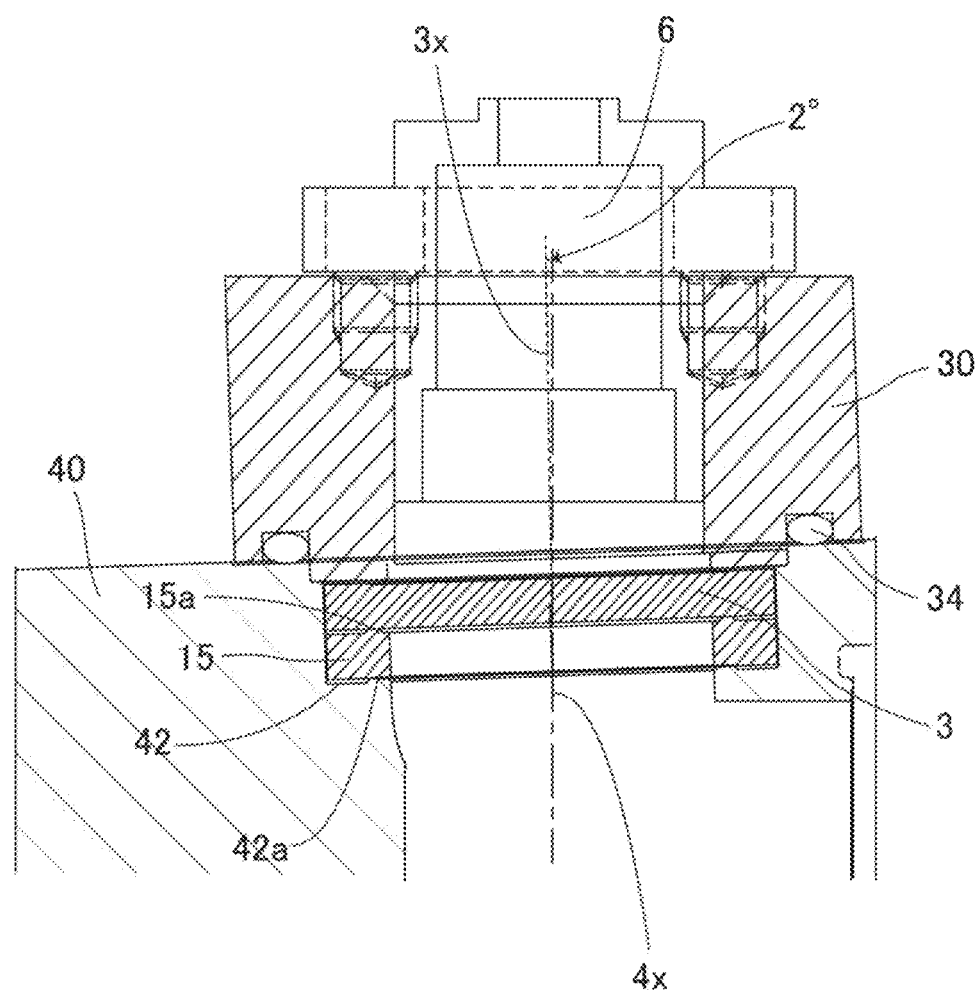
FIG. 3 is a diagram showing an enlarged end portion of the measurement cell, showing a state where the window portion is attached to the cell body via a gasket by the window holding member.

The mounting embodiment of the window portion 3 to the cell body 40 using the gasket 15 will be described below in detail. As shown in FIG. 3, the window portion 3 is supported by the support surface 42 of the cell body 40 via a metal gasket 15 and fixed at an inclined angle. In the present embodiment, the angle formed by the window surface normal direction 3x of the window portion 3, and the central axis 4x of the flow path 4c (or the optical axis of the collimator 6) is set to 2°.

Figure 4A:
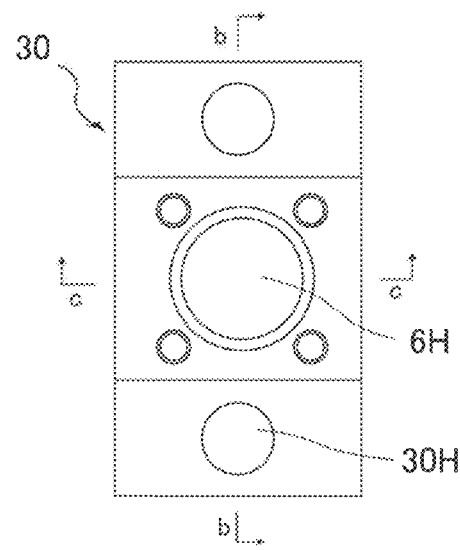
FIGS. 4A-4C are diagrams showing the window holding member.
Figure 4B:
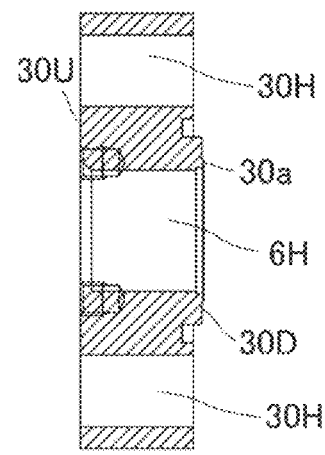
Figure 4C:
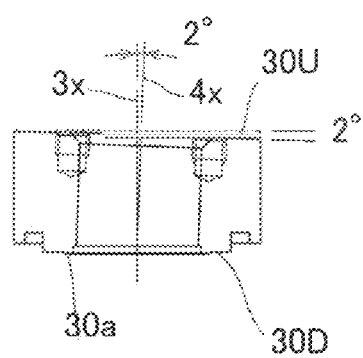

FIGS. 4A-4C are diagrams showing the configuration of a window holding member 30. FIG. 4A is a plan view, FIG. 4B is a cross-sectional view taken along line b-b, and FIG. 4C is a cross-sectional view taken along line c-c. As shown in FIGS. 4A-4C, the window holding member 30 has an insertion hole 6H for inserting the collimator 6, a mounting hole 30H for fixing the window holding member 30 to the cell body 40. Further, as shown in FIG. 4C, the upper surface 30U and the lower surface 30D of the window holding member 30 is formed non-parallel and is inclined 2° with respect to each other. Therefore, the normal direction of the lower surface 30D (corresponding to the window surface normal direction 3x of the window portion 3) and the normal direction of the upper surface 30U (corresponding to the flow path central axial 4x) is made to differ by 2°.

Referring again to FIG. 3, the window portion 3 is pressed against the cell body 40 by the window holding member 30. With respect to the cell body 40, the window holding member 30 is fixed by tightening a fixing screw (not shown) penetrating the mounting hole 30H shown in FIGS. 4A-4C, these contact surfaces are sealed by an O-ring 34.

Figure 5A:
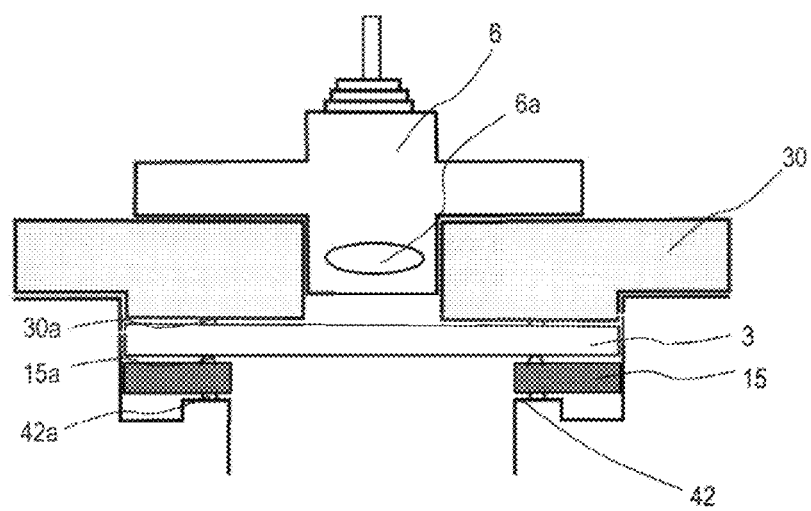
FIG. 5A is a schematic diagram showing an enlarged vicinity of the window portion of the measurement cell.
Figure 5B:
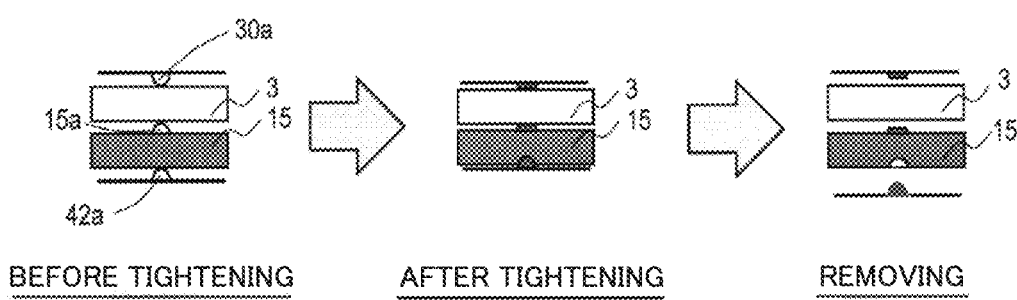
FIG. 5B is a schematic diagram showing the shapes of the gasket or the like before tightening, after tightening, and at the time of removal.

As shown schematically in FIGS. 5A and 5B, in a state before fixing the window holding member 30 to the cell body 40 by tightening the fixing screw, an annular projection portion 5a is formed on the upper surface of the gasket 15, i.e., the surface in contact with the window portion 3 (sometimes referred to as a first surface). On the other hand, the lower surface of the gasket 15, i.e., the surface in contact with the support surface 42 of the cell body 40 (sometimes referred to as a second surface), a flat surface is formed without providing the protrusion portion. The window portion 3 is, for example, a circular plate made of sapphire having a diameter of 16 mm, a thickness of 1.8 mm, the gasket 15 is a ring member made of stainless steel (e.g., made of SUS316L) having an outer diameter of 16 mm, an inner diameter of 11.5 mm, and a thickness of 1.8 mm. The annular protrusion 15a provided on the upper surface of the gasket 15 may have a diameter of 12.6 mm, for example, and the top surface (seal surface) may be formed to have a width of 0.35 mm and a height of 0.1 mm.

Moreover, in the present embodiment, an annular protrusion 42a is also provided on the support surface 42 of the cell body 40. Furthermore, in the window holding member 30, an annular protrusion 30a is also formed on the support surface for supporting the gasket 15 faces the window portion 3. The dimensions of the annular protrusions 42a, 30a may be similar to those of the annular protrusions 15a provided on the gasket 15.

As shown in FIG. 5B, when pressing the window pressing member 30 in a state of sandwiching the window portion 3 and the gasket 15 by tightening the fixing screw with respect to the cell body 40, the protrusion 15a of the upper surface of the gasket 15 is collapsed by the window portion 3, and dents are made on the lower surface of the gasket 15 by the protrusion 42a of the cell body 40. Further, the protrusion 30a of the lower surface of the window pressing member 30 is also collapsed. In this state, a high sealing property is realized. The gasket 15 is preferably formed of a material having a hardness lower than that of the window portion 3, and has a hardness enough to be deformed by the protrusion 42a of the cell body 40.

Furthermore, as shown in FIG. 5B, when removing the window portion 3, although the gasket 15 is deformed, the protrusion 42a of the cell body 40 is kept in a state of hardly deformed. For this reason, by replacing the gasket 15 with a new one, again, it is possible to realize a high sealing property even when the window portion 3 is fixed. Therefore, it becomes a configuration having excellent maintainability at a low cost because only replacement of the gasket 15 is required.

In addition, in the case of using quartz glass as the window portion 3, in the concentration measurement of organic raw material gas having high corrosivity or high precipitability, the window portion 3 will be corroded, or its transparency will be decreased early by the precipitation of the raw material. If the window portion 3 is made of sapphire, a decrease in light transmittance can be suppressed, but the decrease in transmittance is inevitable in a long-term use. Also in this case, by fixing the window portion 3 using the gasket 15 described above, it is possible to improve the transmittance while maintaining a high sealing property by replacing the gasket 15 and fixing it to the cell body 40 again at the same time of replacing or cleaning the window portion 3. The maintainability is good by replacing the window portion 3 in this manner because it can be performed while the cell body 40 is incorporated in the gas flow path.

Moreover, in the above embodiment, since the protrusion portion 30a of the lower surface of the window holding member 30 is also collapsed, the window holding member 30 may also be replaced with a new one when replacing the window portion 3. Alternatively, between the window holding member 30 and the window portion 3, a gasket having the same configuration as the gasket 15 is attached to the front and back opposite, to prevent collapse of the protrusion of the window holding member 30, when replacing the window portion 3, two gaskets sandwiching the window portion 3 may also be replaced.

Further, as shown in FIG. 2, the concentration measurement device 100, the reflecting member 5 is also, fixed to the lower surface of the cell body 40 via the gasket 16 by the pressing member 32. In this configuration, as same as the fixing mode of the window portion 3, an annular protrusion is provided only on the surface for supporting the reflecting member 5 of the gasket 16, also by providing an annular protrusion on the support surface of the cell body 40, it is possible to ensure a high sealing property even after replacement of the reflecting member 5, if replacing the gasket 16 with a new one.

Next, referring to FIGS. 6 to 8, the effect when the window portion 3 is inclined as described above will be described.

Figure 6:
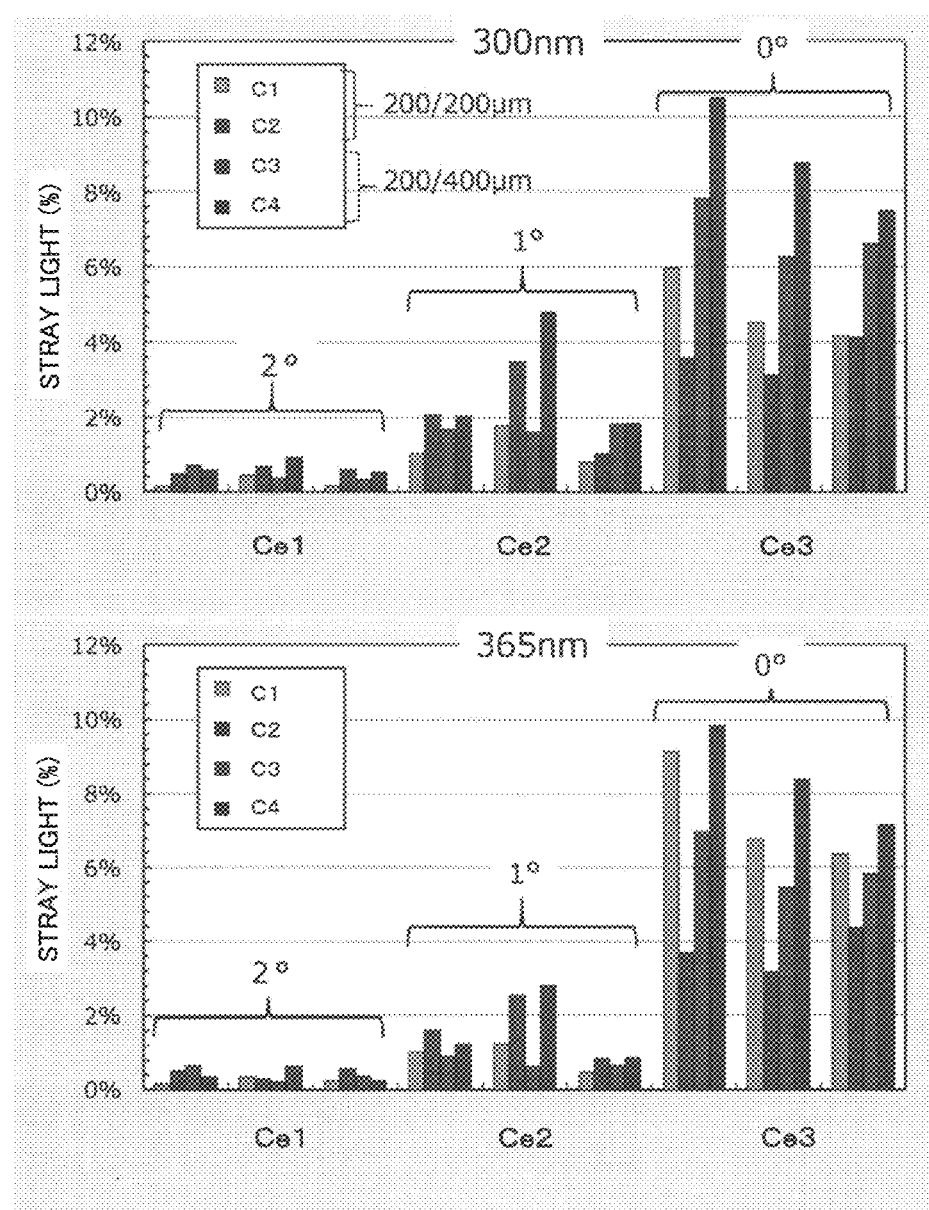
FIG. 6 is a graph showing the ratio of stray light when the inclination angle of the window portion is at 0°, 1°, and 2°.
Figure 7:
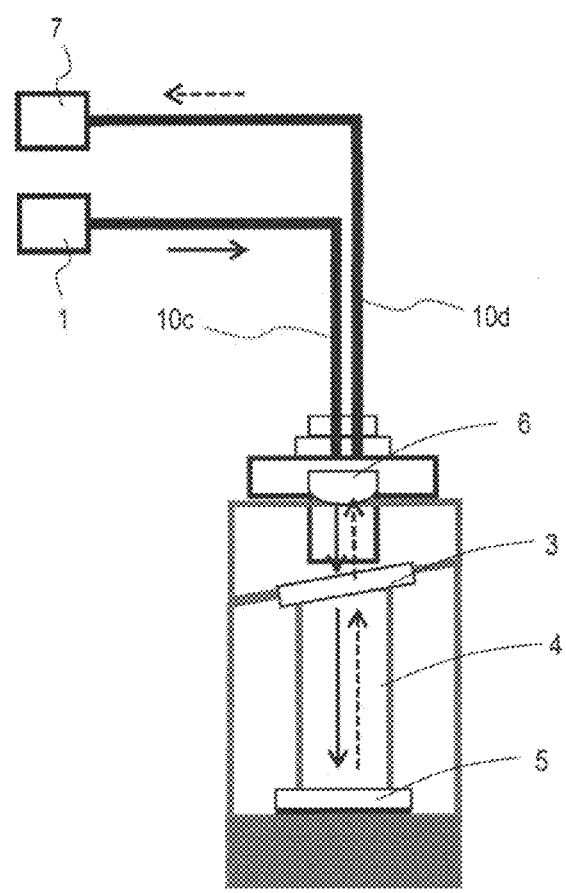
FIG. 7 is a diagram showing a configuration of the concentration measurement device used for measuring stray light.

FIG. 6 is a graph showing the ratio of stray light when the inclination angle of the window portion 3 (the angle formed by the central axis 4x of the flow rate, or the collimator 6 of the optical axis, with respect to the window surface normal direction 3x of the window portion 3), is set to 0°, 1°, and 2°. In addition, the stray light is unnecessary light of the incident light that is reflected to various portions in the flow path in the measurement cell. Since these lights enter into the measurement instrument and cause an error in the measurement result, it is necessary to be eliminated.

The measurement results of stray light, in the case where ultraviolet light having a wavelength of 300 nm is shown in the upper part, and in the case where ultraviolet light having a wavelength of 365 nm is shown in the lower part in FIG. 6. Moreover, in each graph, the results of three tests each using two types of four collimators C1-C4 and three types of measurement cell Ce1~Ce3 (three types tilt angles of 2°, 1°, and 0°) are shown. The collimators C1 and C2 shown at 200/200 μm are collimators both having a fiber diameter of 200 μm when guided by incident light and detection light having different optical fibers 10c and 10d as shown in FIG. 7, and collimators C3 and C4 shown at 200/400 μm are collimators of the incident light having a diameter of 200 μm of an optical fiber 10c, and the detection light having a diameter of 400 μm of an optical fiber 10d.

Further, the graph of FIG. 6 shows the results when an antireflection film (AR coating) is provided on the surface of the collimator side of the window portion 3 (here, the sapphire plate). It is considered that the reflection at the window surface of the collimator side can be greatly suppressed if the AR coat is provided. However, it is difficult to provide the AR coating on the opposite side surface (i.e., the surface in contact with the gas) of the window portion 3, because a problem of contamination of the gas or the like may occur. Therefore, stray light is generated from the opposite side surface of the window portion 3.

As shown in FIG. 6, the incident ultraviolet light has each wavelength of (300 nm/365 nm). When the inclination angle is 0°, the ratio of the stray light (%) is considerably large, when the inclination angle is 1°, the stray light is sufficiently suppressed, when the inclination angle is 2°, it can be seen that stray light is further suppressed. Here, the ratio of stray light shows the ratio of the intensity of the light directly incident on the collimator 6, by being reflected by the window portion 3 without entering the measurement cell 4, with respect to the intensity of the incident light. The stray light ratio measurement can be performed by removing the reflection member 5 of the measurement cell 4 and measuring the detected light intensity.

From the above results, it is understood that the stray light can be suitably reduced by providing the window portion 3 with an inclination or tilt angle of preferably 1° or more, more preferably 2° or more. Further, it is considered that the ratio of stray light decrease as the inclination angle increases, however, since the intensity of the detection light by refraction and reflection also decreases when the inclination angle is too large, the inclination angle is required not too large. From this viewpoint, the tilt angle of the window portion 3 is preferably 10° or less, more preferably 5° or less, further preferably 4° or less.

Figure 8:
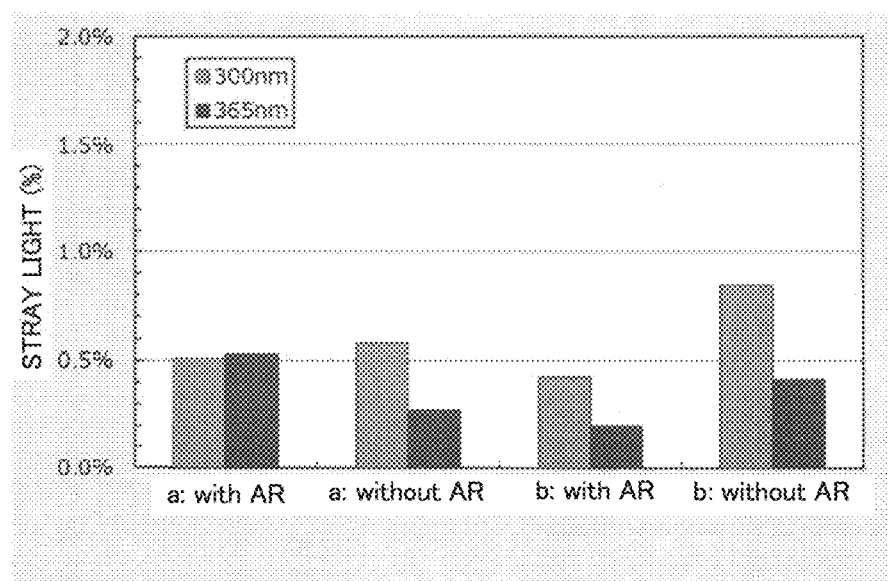
FIG. 8 is a graph showing the ratio of stray light in the case where an anti-reflection coating (AR coating) is provided and in the case where no anti-reflection coating (AR coating) is provided when the inclination angle of the window portion is set to 2°.

FIG. 8 shows the ratio of stray light with or without AR when the tilt angle of the window portion 3 is set to 2°. In FIG. 8, the results of tests performed with incident light having wavelengths of 300 nm and 365 nm with and without AR in the two samples a and b are shown. As can be seen from FIG. 8, when the inclination angle is set to 2°, the stray light ratio becomes 1% or less and the stray light can be sufficiently suppressed, even if the AR coating is not provided. Therefore, by arranging the window portion 3 at an appropriate inclination angle, an advantage of omitting the cost and labor of forming the AR coat can be achieved.

While the concentration measurement device according to the embodiments of the present invention has been described above, the present invention is not limited to the above embodiments, and various modifications can be made without departing from the spirit of the present invention. For example, as the light used for the measurement, light in a wavelength region other than the ultraviolet region may be used. In the above embodiment, the target fluid (gas) to be measured is heated, but the fluid to be measured is not limited to the heated fluid, and it may be any fluid as long as it can flow through the flow path as a gas. Furthermore, in FIGS. 2 and 3, although the inclination is formed on the right shoulder upward, the direction of the inclination may be any direction, for example, the opposite to FIGS. 2 and 3, it may constitute an inclination to the right shoulder downward, it may be inclined in other directions.

INDUSTRIAL APPLICABILITY

The concentration measurement device according to the embodiment of the present invention is incorporated in a gas supply line used in a semiconductor manufacturing equipment or the like, and is suitably used for measuring the concentration of a gas flowing through a flow path.

DESCRIPTION OF NUMERALS

1 Light source
3 Window portion
4 Measurement cell
4a Inlet
4b Outlet
4c Flow path
5 Reflective member
6 Collimator
7 Measurement photodetector
8 Arithmetic circuit
9 Reference photodetector
10a Optical fiber
10b Sensor cable
15 Gasket
15a Protrusion
16 Gasket
20 Pressure sensor
30 Window holding member
32 Holding member
40 Cell body
42a Support surface
42a Protrusion
45 Rear block
50 High-temperature gas unit
52 Electric unit
54 External control device
100 Concentration measurement device

The invention claimed is:

1. A concentration measurement device comprising: a measurement cell having a flow path for flowing a fluid to be measured; a light source for emitting incident light to the measurement cell; a photodetector for detecting light emitted from the measurement cell; and an arithmetic circuit for calculating absorbance and concentration of the fluid to be measured on the basis of an output from the photodetector, wherein
   the measurement cell includes a cell body, a window portion fixed to the cell body so as to contact the flow path, and a reflecting member disposed opposite to the window portion across the flow path, the reflecting member reflecting light incident on the measurement cell through the window portion from the light source and reflecting the light from the measurement cell through the window portion,
   the window portion is fixed to the cell body by a window holding member via a gasket, surfaces of the window portion being disposed so as to be inclined at an inclination angle of equal to or greater than 1° and equal to or less than 5° with respect to a surface orthogonal to the central axis of the flow path, and
   the window holding member includes a lower surface for pressing the window portion, formed non-parallel with the respect to an upper surface facing the lower surface, and a collimator connected to the light source is fixed on the upper surface of the window holding member so that the central axis of the collimator is parallel to the central axis of the flow path.

2. The concentration measurement device according to claim 1, wherein a diameter of the window portion is larger than a diameter of the flow path in the measurement cell and a diameter of the window holding member is larger than the diameter of the window portion.

3. The concentration measurement device according to claim 1, wherein the arithmetic circuit is configured to determine a fluid concentration according to Lambert-Beer's law on the basis of a detection signal of the photodetector that measures the intensity of light traveled back and forth through the flow path of the measurement cell.

4. The concentration measurement device according to claim 1, wherein an inlet and an outlet communicating with the flow path are provided at both ends of the measurement cell, and the inlet and outlet are provided on a first side of the flow path and a second side facing the first side, whereby a vertical measurement cell is formed.

5. The concentration measurement device according to claim 1, wherein the light source and the measurement cell are provided apart from each other by a light guide member including an optical fiber, the light source is configured to synthesize ultraviolet light of a plurality of wavelengths, and the reflecting member includes a reflective layer formed of a material containing aluminum or a reflective layer made of dielectric multilayer films.

* * * * *